United States Patent
Xiao et al.

(10) Patent No.: US 12,553,637 B2
(45) Date of Patent: Feb. 17, 2026

(54) METHOD AND DEVICE FOR CONTROLLING AIR CONDITIONER, AIR CONDITIONER AND STORAGE MEDIUM

(71) Applicants: MIDEA GROUP CO., LTD., Guangdong (CN); GD MIDEA AIR-CONDITIONING EQUIPMENT CO., LTD., Guangdong (CN)

(72) Inventors: Yang Xiao, Guangdong (CN); Jiumin Xiao, Guangdong (CN); Jian Lu, Guangdong (CN); Rupu Huang, Guangdong (CN); Lin Bi, Guangdong (CN)

(73) Assignees: MIDEA GROUP CO., LTD, Guangdong (CN); GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 122 days.

(21) Appl. No.: 18/425,579

(22) Filed: Jan. 29, 2024

(65) Prior Publication Data

US 2024/0167718 A1 May 23, 2024

Related U.S. Application Data

(63) Continuation of application No. PCT/CN2022/082539, filed on Mar. 23, 2022.

(30) Foreign Application Priority Data

Jul. 30, 2021 (CN) .......................... 202110879383.4

(51) Int. Cl.
*F24F 11/84* (2018.01)
*F24F 140/20* (2018.01)

(52) U.S. Cl.
CPC ........... *F24F 11/84* (2018.01); *F24F 2140/20* (2018.01)

(58) Field of Classification Search
CPC ......... F24F 11/84; F24F 2140/20; F25B 1/00; F25B 6/04; F25B 43/006; F25B 40/02; F25B 2400/23; F25B 2400/16
See application file for complete search history.

(56) References Cited

U.S. PATENT DOCUMENTS

| 12,140,359 B2 * | 11/2024 | Welch ..................... F25B 45/00 |
| 2011/0023514 A1 | 2/2011 | Mitra et al. |
| 2018/0216851 A1 * | 8/2018 | Christensen .............. F25B 1/10 |

FOREIGN PATENT DOCUMENTS

| CN | 105783308 A | 7/2016 |
| CN | 106196367 A | 12/2016 |

(Continued)

OTHER PUBLICATIONS

Supplementary European Search Report dated Apr. 23, 2024 received in European Patent Application No. EP 22847860.8.

(Continued)

*Primary Examiner* — Miguel A Diaz
(74) *Attorney, Agent, or Firm* — Scully, Scott, Murphy & Presser, P.C.

(57) ABSTRACT

A method and a device for controlling an air conditioner, an air conditioner and a computer-readable storage medium are provided. After the air conditioner is started and runs for a period of time, the gas phase side valve is controlled to open to switch the air conditioner to the phase separation refrigeration mode. In the phase separation refrigeration mode, the gaseous low-temperature refrigerant can be separated through the gas-liquid separation device, and be controlled to reach the heat exchanger. The refrigerant at the outlet of the condenser is heat exchanged again through the gaseous (Continued)

low-temperature refrigerant and the heat exchanger to increase the cooling capacity of the air conditioner.

9 Claims, 7 Drawing Sheets

(56) References Cited

FOREIGN PATENT DOCUMENTS

| | | | |
|---|---|---|---|
| CN | 107763774 | A | 3/2018 |
| CN | 110645745 | A | 1/2020 |
| CN | 112443999 | A | 3/2021 |
| CN | 213713302 | U | 7/2021 |
| EP | 3693681 | A1 | 8/2020 |
| JP | 2019074250 | A | 5/2019 |
| WO | 2020208752 | A1 | 10/2020 |

OTHER PUBLICATIONS

International Search Report and Written Opinion dated Jun. 23, 2022 received in International Application No. PCT/CN2022/082539.
First Office Action dated Apr. 30, 2025 received in Chinese Patent Application No. 202110879383.4.

* cited by examiner

METHOD AND DEVICE FOR CONTROLLING AIR CONDITIONER, AIR CONDITIONER AND STORAGE MEDIUM

CROSS-REFERENCE TO RELATED APPLICATIONS

This application is a continuation application of PCT International Patent Application No. PCT/CN2022/082539, filed on Mar. 23, 2022, which claims priority to and benefits of Chinese Patent Application No. 202110879383.4, filed on Jul. 30, 2021, the entire content of each of which are incorporated herein by reference. No new matter has been introduced.

FIELD

The present application relates to the field of air conditioners, and in particular to a method and a device for controlling an air conditioner, an air conditioner and a computer-readable storage medium.

BACKGROUND

Existing air conditioners with large cooling capacity and high energy efficiency can only increase the cooling capacity by increasing the evaporator and condenser. However, increasing the evaporator and condenser has the problem of high cost.

The above content is only used to assist in understanding the technical solutions of the present application, and does not represent an admission that the above content is related art.

SUMMARY

The main purpose of the present application is to provide a method and a device for controlling an air conditioner, an air conditioner and a computer-readable storage medium, aiming to at least solve the high-cost problem in the related art and improve the refrigeration capacity of the air conditioner.

In order to achieve the above purpose, the present application provides a method for controlling an air conditioner. The air conditioner includes a compressor, a condenser and a heat exchanger connected in sequence and the gas-liquid separation device, an outlet of the heat exchanger is connected to an inlet of the gas-liquid separation device, a gas phase outlet of the gas-liquid separation device is connected to the other inlet of the heat exchanger, and a gas phase side valve is provided between the gas phase outlet of the gas-liquid separation device and the other inlet of the heat exchanger.

The method for controlling the air conditioner includes the following steps:
  opening the gas phase side valve to enter a phase separation refrigeration mode, in response to passage of a first preset period of time from starting up the air conditioner;
  controlling a gaseous low-temperature refrigerant separated by the gas-liquid separation device to pass through the gas phase side valve and reach the heat exchanger; and
  controlling the gaseous low-temperature refrigerant to exchange heat with refrigerant at an outlet of the condenser through the heat exchanger to increase supercooling degree of the refrigerant at the outlet of the condenser.

In an embodiment, the air conditioner further includes an evaporator and a first pressure detection device, a liquid phase outlet of the gas-liquid separation device is connected to the evaporator, the evaporator is connected to the compressor, and the first pressure detection device is provided on a pipeline between the evaporator and the compressor;
  before the opening the gas phase side valve in response to the passage of the first preset period of time from starting up the air conditioner, the method further includes:
  controlling the gas phase side valve to close for a second preset period of time from the starting up the air conditioner, such that the air conditioner operates in a normal refrigeration mode during the second preset period of time;
  determining a target period of time according to the second preset period of time and the first preset period of time, and obtaining an average pressure corresponding to the first pressure detection device during the target period of time; and
  determining an initial opening according to the average pressure;
  the opening the gas phase side valve in response to the passage of the first preset period of time from the starting up the air conditioner comprises:
  opening the gas phase side valve according to the initial opening, in response to the passage of the first preset period of time from the starting up the air conditioner.

In an embodiment, the air conditioner further includes a second pressure detection device, and the second pressure detection device is provided on a pipeline between the gas phase outlet of the gas-liquid separation device and the gas phase side valve;
  after controlling the gaseous low-temperature refrigerant to exchange heat with the refrigerant at the outlet of the condenser through the heat exchanger, the method further includes:
  obtaining a first current pressure corresponding to the first pressure detection device and a second current pressure corresponding to the second pressure detection device;
  calculating a current pressure difference according to the first current pressure and the second current pressure;
  determining whether the current pressure difference is less than a preset pressure value;
  comparing the first current pressure with the second current pressure, in response to that the current pressure difference is not less than the preset pressure value;
  determining a target opening according to a comparison result and a current opening; and
  adjusting an opening of the gas phase side valve according to the target opening.

In an embodiment, determining the target opening according to the comparison result and the current opening includes:
  determining the target opening according to a first preset constant and the current opening, in response to the comparison result being that the first current pressure is less than the second current pressure; and
  determining the target opening according to a second preset constant and the current opening, in response to the comparison result being that the first current pressure is greater than or equal to the second current pressure.

In an embodiment, after adjusting the opening of the gas phase side valve according to the target opening, the method further includes:

in response to that the gas phase side valve runs with the target opening for a third preset time, obtaining the first current pressure corresponding to the first pressure detection device and the second current pressure corresponding to the second pressure detection device.

In an embodiment, after determining whether the current pressure difference is less than the preset pressure value, the method further includes:

keeping the current opening of the gas phase side valve unchanged, in response to that the current pressure difference is less than the preset pressure value; and in response to that the gas phase side valve runs with the current opening for a fourth preset time, obtaining the first current pressure corresponding to the first pressure detection device and the second current pressure corresponding to the second pressure detection device.

In an embodiment, after controlling the gaseous low-temperature refrigerant to exchange heat with the refrigerant at the outlet of the condenser through the heat exchanger, the method further includes:

controlling the gaseous refrigerant after passing through the heat exchanger to merge with the refrigerant at the outlet of the evaporator to obtain a merged refrigerant; and controlling the merged refrigerant to return to the compressor through a muffler.

In addition, to achieve the above purpose, the present application also proposes a device for controlling the air conditioner, the device for controlling the air conditioner includes:

a phase separation refrigeration module, configured to open a gas phase side valve to enter a phase separation refrigeration mode, in response to passage of a first preset period of time from starting up the air conditioner;

a refrigerant control module, configured to control a gaseous low-temperature refrigerant separated by a gas-liquid separation device to pass through the gas phase side valve and reach a heat exchanger; and a refrigeration enhancement module, configured to control the gaseous low-temperature refrigerant to exchange heat with refrigerant at an outlet of a condenser through the heat exchanger, so as to increase the supercooling degree of the refrigerant at the outlet of the condenser.

In addition, to achieve the above purpose, the present application also proposes an air conditioner, the air conditioner includes a compressor, a condenser and a heat exchanger connected in sequence and a gas-liquid separation device, an outlet of the heat exchanger is connected to an inlet of the gas-liquid separation device, a gas phase outlet of the gas-liquid separation device is connected to the other inlet of the heat exchanger, and a gas phase side valve is provided between the gas phase outlet of the gas-liquid separation device and the other inlet of the heat exchanger;

the air conditioner further includes: a memory, a processor and a program for controlling the air conditioner stored on the memory and executable on the processor, and when the program for controlling the air conditioner is executed by the processor, the method for controlling the air conditioner as described above is implemented.

In addition, to achieve the above purpose, the present application also proposes a computer-readable storage medium, a program for controlling an air conditioner is stored on the computer-readable storage medium, and when the program for controlling the air conditioner is executed by a processor, the method for controlling the air conditioner as described above is implemented.

In the method for controlling the air conditioner proposed in the present application, after the air conditioner is started and operates for a period of time, the gas phase side valve is controlled to open, causing the air conditioner to switch to the phase separation refrigeration mode. In the phase separation refrigeration mode, the gaseous low-temperature refrigerant can be separated by the gas-liquid separation device, and is controlled to reach the heat exchanger. The refrigerant at the outlet of the condenser is exchanged heat again through the gaseous low-temperature refrigerant and the heat exchanger, thereby increasing the supercooling degree of the refrigerant at the outlet of the condenser to increase cooling capacity of the air conditioner. Compared with the existing method of increasing the evaporator and condenser, this solution adopts phase separation technology, which can not only increase the refrigeration capacity without increasing the cost too much.

DESCRIPTION OF REFERENCE SIGNS

| reference sign | name | reference sign | name |
| --- | --- | --- | --- |
| 1 | compressor | 2 | condenser |
| 3 | heat exchanger | 4 | gas phase side valve |
| 5 | refrigeration valve | 6 | gas-liquid separation device |
| 7 | evaporator | 8 | second pressure detection device |
| 9 | first pressure detection device | | |

The realization of the purpose, functional features and advantages of the present application will be further described in conjunction with the embodiments, with reference to the accompanying drawings.

DETAILED DESCRIPTION OF EMBODIMENTS

It should be understood that the specific embodiments described here are only used to explain the present application and are not used to limit the present application.

Figure 1:
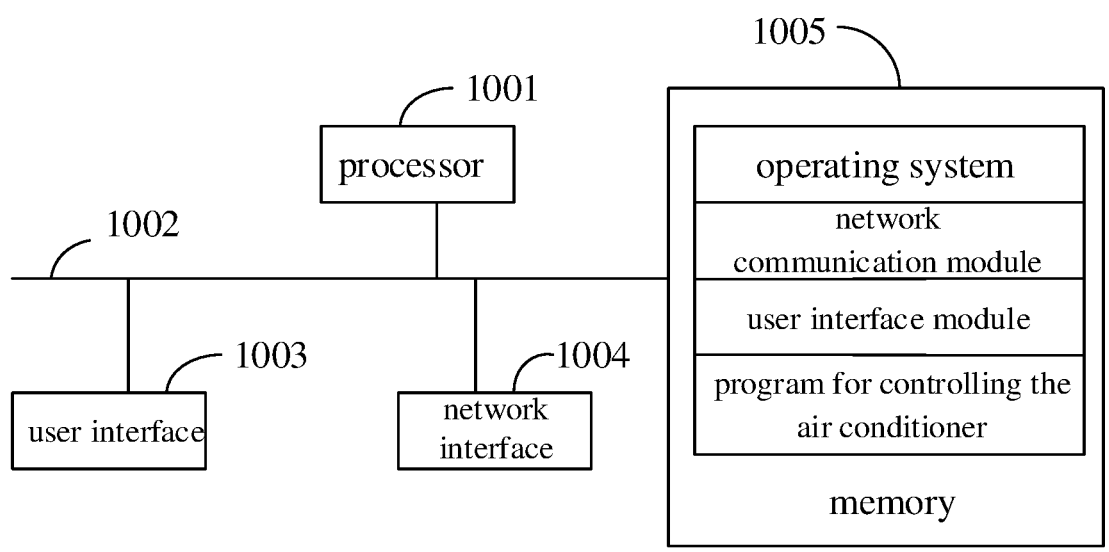
FIG. 1 is a schematic structural diagram of an air conditioner in the hardware operating environment according to an embodiment of the present application.

Referring to FIG. 1, FIG. 1 is a schematic structural diagram of an air conditioner in the hardware operating environment according to the embodiment of the present application.

As shown in FIG. 1, the air conditioner can include: a processor 1001, such as a central processing unit (CPU), a communication bus 1002, a user interface 1003, a network interface 1004 and a memory 1005. The communication bus 1002 is configured to implement connection communication between these components. The user interface 1003 can include a display and an input unit such as buttons. The optional user interface 1003 can also include a standard wired interface and a wireless interface. The network interface 1004 can optionally include a standard wired interface or a wireless interface (such as a Wi-Fi interface). The memory 1005 can be a high-speed random access memory (RAM) or a stable memory (non-volatile memory), such as a disk memory. The memory 1005 can optionally be a storage device independent of the aforementioned processor 1001.

Those skilled in the art can understand that the device structure shown in FIG. 1 does not limit the air conditioner, and can include more or less components than shown, or combinations of certain components, or components arranged differently.

As shown in FIG. 1, the memory 1005 as a computer-readable storage medium can include an operating system, a network communication module, a user interface module, and a program for controlling the air conditioner.

In the air conditioner shown in FIG. 1, the network interface 1004 is mainly configured to be connected to the external network and perform data communication with other network devices. The user interface 1003 is mainly configured to be connected to user equipment and perform data communication with the user equipment. The application device calls the program for controlling the air conditioner stored in the memory 1005 through the processor 1001, and executes the method for controlling the air conditioner provided by the embodiment of the present application.

Based on the above hardware structure, an embodiment of the method for controlling the air conditioner of the present application is proposed.

Figure 2:
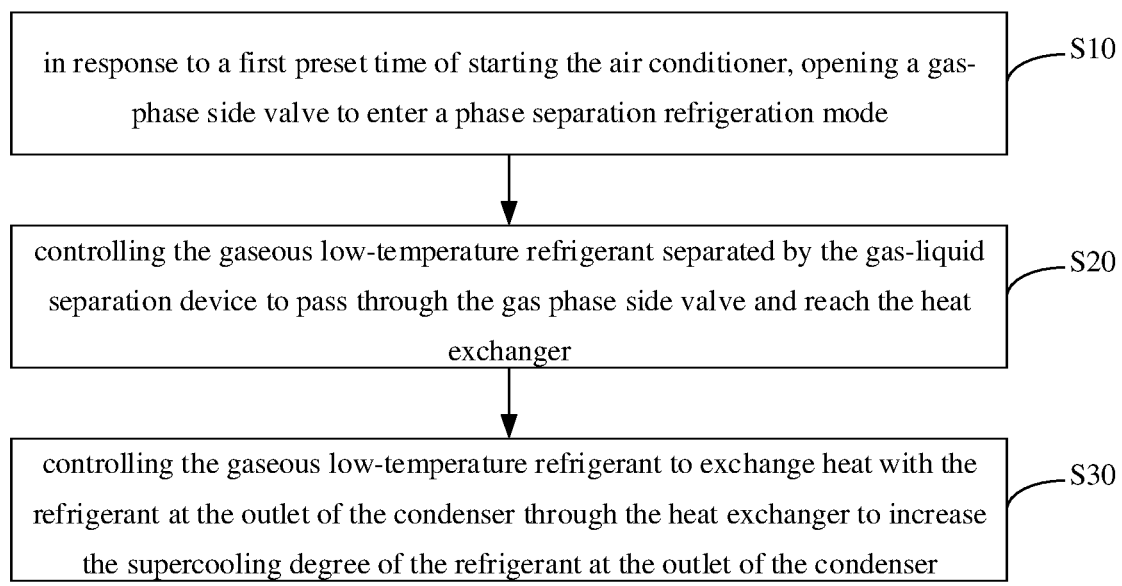
FIG. 2 is a schematic flow chart of a method for controlling the air conditioner according to a first embodiment of the present application.

Referring to FIG. 2, FIG. 2 is a schematic flowchart of the method for controlling the air conditioner according to a first embodiment of the present application.

In the first embodiment, the air conditioner includes a compressor, a condenser and a heat exchanger connected in sequence. The air conditioner also includes a gas-liquid separation device. An outlet of the heat exchanger is connected to an inlet of the gas-liquid separation device. A gas-phase outlet of the gas-liquid separation device is connected to the other inlet of the heat exchanger. A gas-phase side valve is provided between the gas phase outlet of the gas-liquid separation equipment and the other inlet of the heat exchanger.

The method for controlling the air conditioner includes the following steps:

step S10, in response to passage of a first preset period of time from starting up the air conditioner, opening a gas-phase side valve to enter a phase separation refrigeration mode.

It should be noted that the execution subject of this embodiment can be an air conditioner, such as a cabinet air conditioner, a hanging air conditioner, a central air conditioner, or other types of air conditioners, which is not limited in this embodiment.

It should be noted that the gas-liquid separation device in this embodiment can be a gas-liquid separator, or a device that can achieve the same or similar functions, which is not limited in this embodiment. The heat exchanger in this embodiment can be a plate heat exchanger, or a device that can achieve the same or similar functions, which is not limited in this embodiment. The gas phase side valve in this embodiment can be a solenoid valve, or a device that can achieve the same or similar functions, which is not limited in this embodiment.

Figure 3:
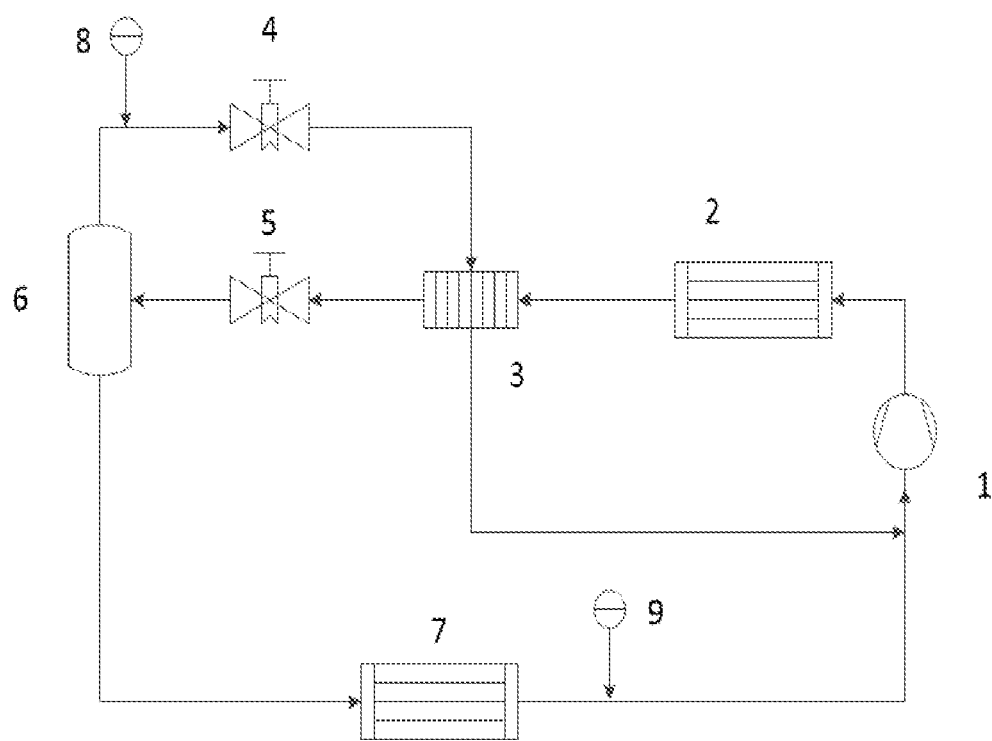
FIG. 3 is a schematic diagram of an air conditioner system of the method for controlling the air conditioner according to the first embodiment of the present application.

It should be understood that, as shown in FIG. 3, which is a schematic diagram of an air conditioning system. The air conditioner in this embodiment can include a compressor 1, a condenser 2 and a heat exchanger 3. The outlet of the compressor 1 can be connected to the inlet of the condenser 2, and the outlet of the condenser 2 can be connected to the inlet of the heat exchanger 3. The outlet of the heat exchanger 3 can be connected to the inlet of the gas-liquid separation device 6. Furthermore, a refrigeration valve 5 can be provided between the outlet of the heat exchanger 3 and the gas-liquid separation device 6.

It can be understood that since the gas-liquid separation device can separate the refrigerant into gas and liquid, the gas-liquid separation device 6 is provided with one inlet and two outlets, and the two outlets are respectively a gas phase outlet and a liquid phase outlet. The gaseous refrigerant separated by the gas-liquid separation device 6 can flow out from the gas phase outlet, and the liquid refrigerant separated by the gas-liquid separation device 6 can flow out from the liquid phase outlet.

It can be understood that the gas phase outlet of the gas-liquid separation device 6 can be connected to another inlet of the heat exchanger 3, and the other outlet of the heat exchanger 3 can be connected to the inlet of the compressor 1. The gas phase side valve 4 can also be provided between the gas phase outlet of the gas-liquid separation device 6 and the other inlet of the heat exchanger 3. The liquid phase outlet of the gas-liquid separation device 6 can be connected to the inlet of the evaporator 7, and the outlet of the evaporator 7 can be connected to the inlet of the compressor 1.

It can be understood that the refrigeration mode of the air conditioner in this embodiment can include a normal refrigeration mode and a phase separation refrigeration mode. When the air conditioner operates in the normal refrigeration mode, the refrigeration valve 5 can be controlled to open and the gas phase side valve 4 to close. At this time, a normal refrigeration operation is performed. When the air conditioner operates in the phase separation refrigeration mode, the refrigeration valve 5 can be controlled to open, and the gas phase side valve 4 is also opened. At this time, the gaseous low-temperature refrigerant separated by the gas-liquid separation device 6 and the heat exchanger 3 are used to exchange the refrigerant at the outlet of the condenser after heat exchange through the condenser again, thereby increasing the supercooling of the refrigerant to achieve better refrigeration effects.

It should be noted that a second preset period of time and parameter n can be set in advance. For example, the second preset period of time can be set to 3 minutes or other values, which is not limited in this embodiment. In this embodiment, 3 minutes will be used as an example for explanation.

The first preset period of time can be calculated based on the second preset period of time and the parameter n. For example, when the second preset period of time is 3 minutes, the first preset period of time can be calculated as (3+n) minutes. In this embodiment, the specific value of the parameter n is not limited.

It can be understood that when the air conditioner just starts cooling, the air conditioner is controlled to enter the normal refrigeration mode. When the air conditioner starts cooling and runs for the first preset period of time, that is, when the air conditioner starts cooling and runs for (3+n) minutes, the gas phase side valve is controlled to open to switch the normal refrigeration mode to the phase separation refrigeration mode.

Step S20, controlling the gaseous low-temperature refrigerant separated by the gas-liquid separation device to pass through the gas phase side valve and reach the heat exchanger.

It should be understood that, in the phase separation refrigeration mode, the gas-liquid separation device can be controlled to separate the refrigerant from gas to liquid to obtain the separated gaseous low-temperature refrigerant. Then, the separated gaseous low-temperature refrigerant is controlled to flow out from the corresponding gas phase outlet of the gas-liquid separation device, is connected to the heat exchanger 3 through the gas phase side valve 4, and flows into the other inlet of the heat exchanger 3.

Step S30, controlling the gaseous low-temperature refrigerant to exchange heat with the refrigerant at the outlet of the condenser through the heat exchanger to increase the supercooling degree of the refrigerant at the outlet of the condenser.

It can be understood that after the refrigerant discharged from the compressor undergoes heat exchange through the condenser, and the refrigerant at the outlet of the condenser is obtained. The refrigerant at the outlet of the condenser flows in from the inlet of the heat exchanger, and the gaseous low-temperature refrigerant separated by the gas-liquid separation device flows in from the other inlet of the heat exchanger. Therefore, the refrigerant at the outlet of the condenser after heat exchange in the condenser can be heat exchanged again through the gaseous low-temperature refrigerant in the heat exchanger, so that the supercooling degree of the refrigerant at the outlet of the condenser can be improved, and the refrigerant at the outlet of the condenser with increased supercooling degree is obtained. By exchanging heat with the indoor return air in the evaporator through the refrigerant at the outlet of the condenser with increased supercooling degree, the better refrigeration effect can be achieved.

It can be understood that this solution does not require an increase in the condenser and evaporator, nor does it require too much cost. This solution adopts phase separation technology, which can greatly improve the energy efficiency of the air conditioner. The gaseous refrigerant separated by the gas-liquid separation device is used to increase the supercooling degree of the refrigerant in the heat exchangers, which can further improve the refrigeration capacity.

It should be understood that, as shown in FIG. 3, after controlling the gaseous low-temperature refrigerant to enter the heat exchanger for heat exchange, the gaseous refrigerant after heat exchange through the heat exchanger and the refrigerant at the outlet of the evaporator after heat exchange through the evaporator are merged, the merged refrigerant is transferred to a muffler, and enters the compressor through the muffler.

In this embodiment, after the air conditioner starts and runs for a period of time, the gas phase side valve is controlled to open, causing the air conditioner to switch to the phase separation refrigeration mode. In the phase separation refrigeration mode, the gaseous low-temperature refrigerant can be separated through the gas-liquid separation device, and is controlled to reach the heat exchanger. The refrigerant at the outlet of the condenser is exchanged heat again through the gaseous low-temperature refrigerant and the heat exchanger, thereby increasing the supercooling degree of the refrigerant at the outlet of the condenser to increase the cooling capacity of the air conditioner. Compared to the existing method of increasing the evaporator and condenser, this solution adopts phase separation technology, which can not only increase the refrigeration capacity, but also does not require increase the cost too much.

Figure 4:
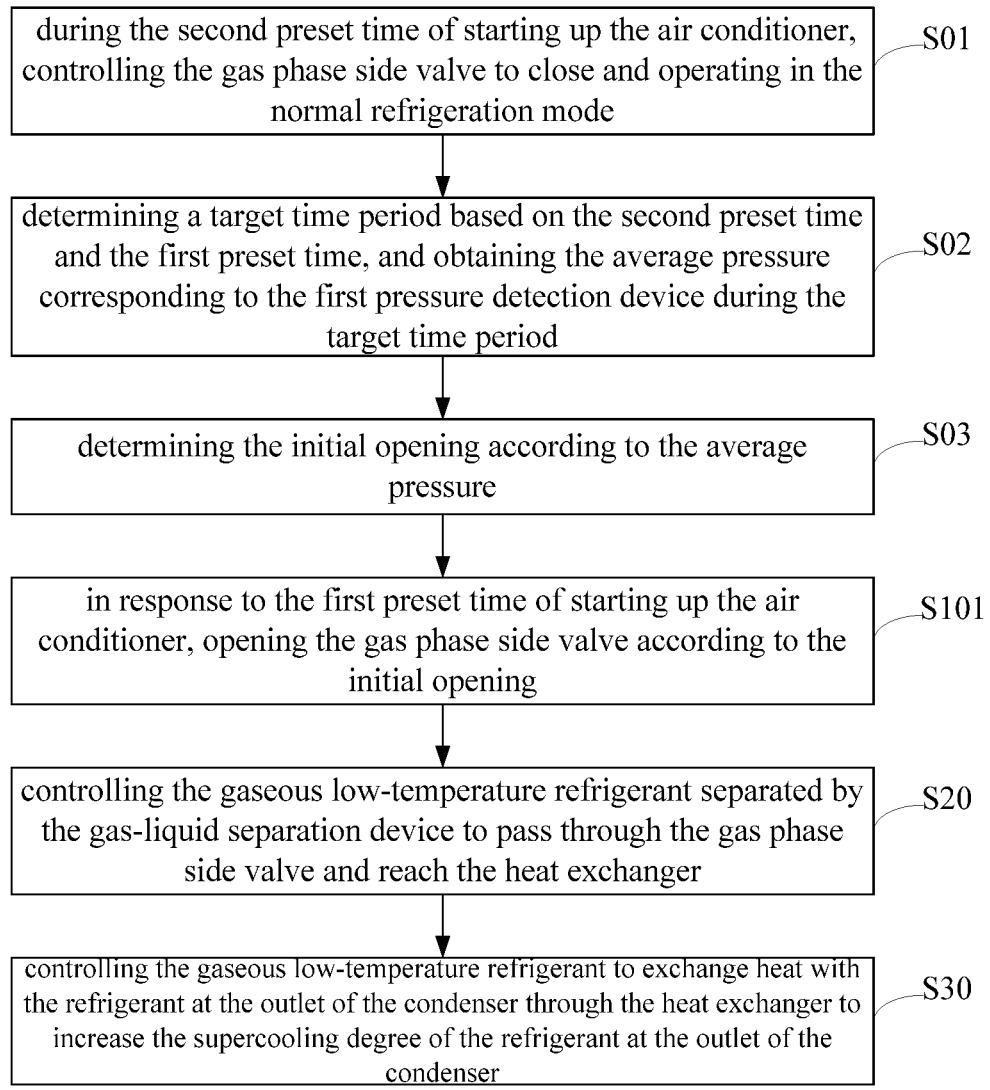
FIG. 4 is a schematic flow chart of a method for controlling the air conditioner according to a second embodiment of the present application.

In an embodiment, as shown in FIG. 4, a second embodiment of the method for controlling the air conditioner according to the present application is proposed based on the first embodiment. The air conditioner further includes an evaporator and a first pressure detection device. The liquid phase outlet of the gas-liquid separation device is connected to the evaporator, the evaporator is connected to the compressor, and the first pressure detection device is provided on the pipeline between the evaporator and the compressor.

Before step S10, the method also includes:

step S01, during the second preset period of time from starting up the air conditioner, controlling the gas phase side valve to close and operating in the normal refrigeration mode.

It should be noted that, as shown in FIG. 3, the air conditioner in this embodiment can also include an evaporator 7 and a first pressure detection device 9.

The liquid phase outlet of the gas-liquid separation device 6 can be connected to the inlet of the evaporator 7, and the outlet of the evaporator 7 can be connected to the inlet of the compressor 1. The first pressure detection device 9 can be provided on the pipeline between the evaporator 7 and the compressor 1. The specific location of the first pressure detection device 9 is not limited in this embodiment, as long as the first pressure detection device 9 is provided on the pipeline between the evaporator 7 and the compressor 1, which is not limited in this embodiment.

It should be understood that during the second preset period of time from starting the air conditioner for cooling, the gas phase side valve can be closed. For example, when the second preset period of time is 3 minutes, the gas phase side valve can be locked within 3 minutes of starting the air conditioner for cooling. When the gas phase side valve is closed, the supercooling degree of the refrigerant at the outlet of the condenser cannot be increased by the gaseous low-temperature refrigerant separated by the gas-liquid separation device, and the air conditioner cannot be controlled to operate in the normal refrigeration mode to perform the normal refrigeration operation.

Step S02, determining a target period of time based on the second preset period of time and the first preset period of time, and obtaining the average pressure corresponding to the first pressure detection device during the target period of time.

It should be noted that the target period of time can be calculated based on the second preset period of time and the first preset period of time. During the target period of time, the first pressure detection device performs pressure detection to obtain the pressure parameter, and the average pressure is calculated according to the pressure parameter and the target period of time. The target period of time can be the time period between the end time of the second preset period of time and the end time of the first preset period of time.

In specific implementation, for example, when the second preset period of time is 3 min and the first preset period of time is (3+n) min, the target period of time can be determined to be the time period between 3rd min and (3+n)-th min. Between 3rd min and (3+n)-th min, the pressure of the return air is detected through the first pressure detection device to obtain the pressure parameter, and then the average pressure is calculated. For example, when the parameter n is 1, the second preset period of time is 3 min, and the first preset period of time is 4 min, the target period of time can be determined to be the time period between 3rd min and 4th min. Between 3rd min and 4th min, the pressure of the return air is detected through the first pressure detection device to obtain the pressure parameter, and then the average pressure $P\_ave\_valve9$ is calculated.

Step S03, determining the initial opening according to the average pressure.

It should be understood that after determining the average pressure, the initial opening of the gas phase side valve can be determined based on the average pressure. Specifically, the initial opening can be determined based on the average pressure through the following formula:

$$LR4\_0 = LR\_min + (LR\_max - LR\_min)/(P\_ave\_valve9 - P\_min) * (P\_max - P\_min);$$

where $LR4\_0$ is the initial opening, $P\_ave\_valve9$ is the average pressure, Pmax is the maximum pressure, Pmin is the minimum pressure, LRmax is the maximum opening, and LRmin is the minimum opening. Pmax, Pmin, LRmax and LRmin are preset parameters. The air conditioner can be tested in advance for working conditions, and the values of these parameters can be determined based on the results of the working condition test. The values of these parameters can also be determined through other methods and can be set according to the actual situation, which is not limited in this embodiment.

Correspondingly, step S10 includes:

step S101, in response to the first preset period of time of starting up the air conditioner, opening the gas phase side valve according to the initial opening.

It can be understood that after determining the initial opening, when the time during which the air conditioner starts up and runs reaches the first preset period of time, the gas phase side valve can be opened according to the calculated initial opening, in order to adjust the opening of the gas phase side valve to the initial opening.

In this embodiment, when the air conditioner is just turned on for refrigeration, the gas phase side valve is closed and the air conditioner runs in the normal refrigeration mode. Between the end of the second preset period of time and the start of the first preset period of time, the average pressure of the return air is detected through the first pressure detection device, and the initial opening of the gas-phase side valve is calculated according to the average pressure. When the time during which the air conditioner starts up and runs for refrigeration reaches the first preset period of time, the gas-phase side valve is controlled to open based on the initial opening to switch the air conditioner to the phase separation refrigeration mode, and the initial opening of the gas phase side valve is determined through the average pressure, which can achieve precise control.

Figure 5:
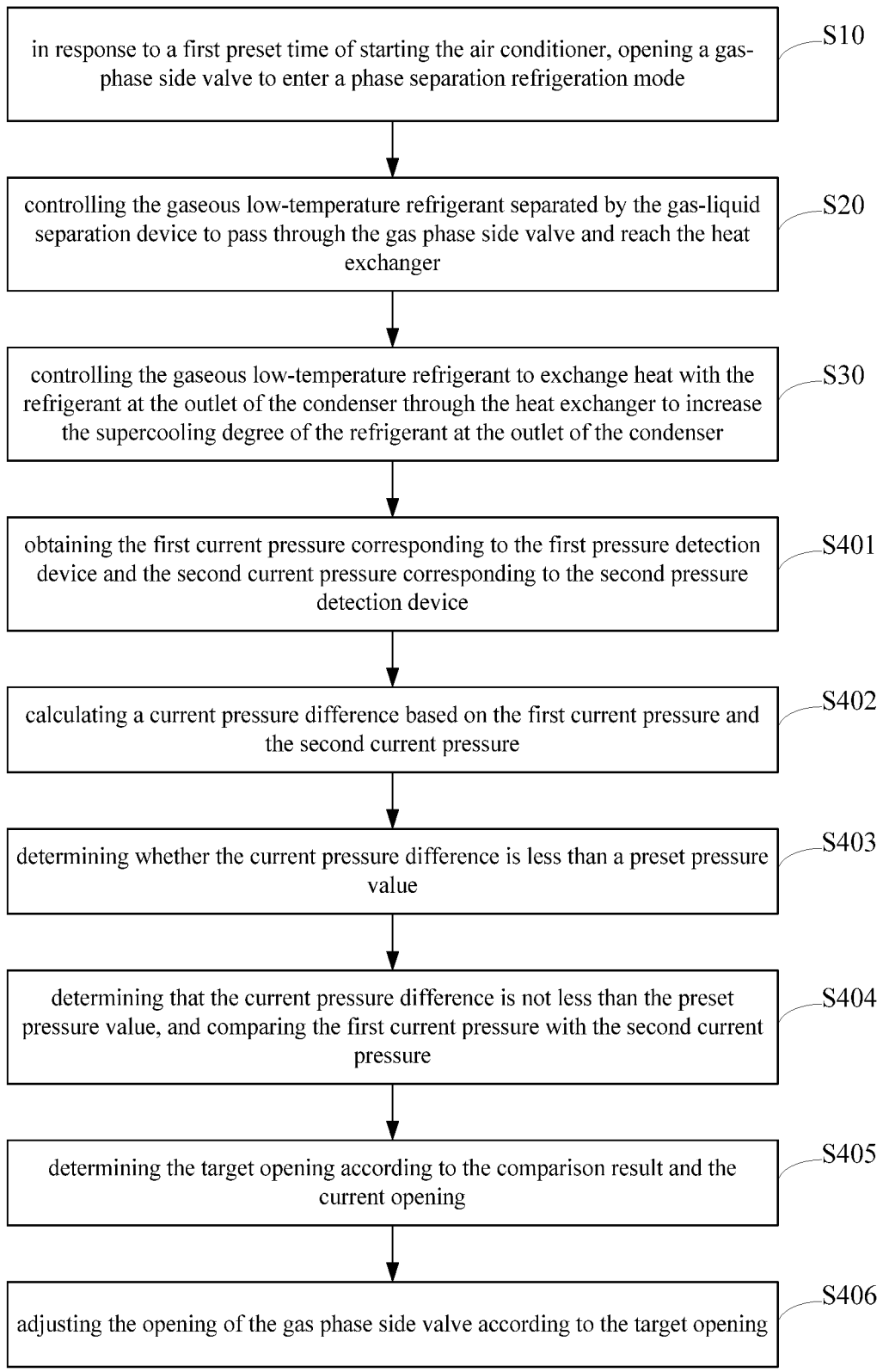
FIG. 5 is a schematic flow chart of a method for controlling the air conditioner according to a third embodiment of the present application.

In an embodiment, as shown in FIG. 5, a third embodiment of the method for controlling the air conditioner according to the present application is proposed based on the first embodiment or the second embodiment. In this embodiment, the explanation is based on the first embodiment. The air conditioner further includes a second pressure detection device, which is provided on the pipeline between the gas phase outlet of the gas-liquid separation device and the gas phase side valve.

After step S30, the method also includes:

step S401, obtaining the first current pressure corresponding to the first pressure detection device and the second current pressure corresponding to the second pressure detection device.

It should be noted that, as shown in FIG. 3, the air conditioner in this embodiment can also include a second pressure detection device 8.

The second pressure detection device 8 can be provided on the pipeline between the gas phase outlet of the gas-liquid separation device 6 and the gas phase side valve 4. The specific location of the second pressure detection device 8 is not limited in this embodiment, as long as the second pressure detection device 8 is provided on the pipeline between the gas phase outlet of the gas-liquid separation device 6 and the gas phase side valve 4.

For example, the second pressure detection device 8 can be provided in the middle position of the pipeline between the gas phase outlet of the gas-liquid separation device 6 and the gas phase side valve 4, or provided at the position, close to the gas-liquid separation device 6, of the pipeline between the gas phase outlet of the gas-liquid separation device 6 and the gas phase side valve 4, or provided at the position, close to the gas phase side valve 4, of the pipeline between the gas phase outlet of the gas-liquid separation device 6 and the gas phase side valve 4, which is not limited in this embodiment.

It should be noted that the first pressure detection device and the second pressure detection device can be pressure detection devices of the same type, or pressure detection devices of different types, as long as they can detect pressure, which is not limited in this embodiment.

It should be understood that after the air conditioner is controlled to switch to the phase separation refrigeration mode, the pressure can be detected through the first pressure detection device and the second pressure detection device respectively to obtain the first pressure parameter and the second pressure parameter.

It can be understood that the corresponding first current pressure can be determined according to the first pressure parameter of the first pressure detection device, and the corresponding second current pressure can be determined according to the second pressure parameter of the second pressure detection device. The first current pressure can be represented by $P\_9$, and the second current pressure can be represented by $P\_8$.

It can be understood that the first pressure detection device detects the return gas side pressure, and the second pressure detection device detects the gaseous side pressure of the gas-liquid separation device, that is, the first current pressure is the current pressure on the return gas side, and the second current pressure is the current pressure on the gaseous side of the gas-liquid separation device.

Step S402, calculating a current pressure difference based on the first current pressure and the second current pressure.

It can be understood that, after obtaining the first current pressure and the second current pressure, the current pressure difference can be determined according to the first current pressure and the second current pressure. Specifically, the current pressure difference can be obtained by subtracting the second current pressure from the first current pressure.

It can be understood that the current pressure difference can be calculated according to the first current pressure and the second current pressure through the following formula:

$$\Delta P = P\_8 - P\_9; \quad (5)$$

where $\Delta P$ is the current pressure difference, $P\_8$ is the second current pressure, and $P\_9$ is the first current pressure.

Step S403, determining whether the current pressure difference is less than a preset pressure value.

It should be noted that the preset pressure value P0 can be set in advance and can be set according to actual conditions, and the specific value of the preset pressure value P0 is not limited in this embodiment.

It should be understood that after determining the current pressure difference value $\Delta P$, the current pressure difference value $\Delta P$ can be compared with the preset pressure value P0 to determine whether the current pressure difference value $\Delta P$ is less than the preset pressure value P0.

Step S404, determining that the current pressure difference is not less than the preset pressure value, and comparing the first current pressure with the second current pressure.

It should be understood that if the current pressure difference value $\Delta P$ is not less than the preset pressure value P0, that is, when $\Delta P > P0$, the pressures of $P\_8$ and $P\_9$ can be compared, that is, the first current pressure $P\_9$ and the second current pressure $P\_8$ can be compared to obtain a comparison result.

Step S405, determining the target opening according to the comparison result and the current opening.

It should be understood that the target opening can be determined through different strategies according to different comparison results, and the gas phase side valve 4 can be adjusted through the target opening to reduce pressure difference between the return gas side pressure and the gas side pressure of the gas-liquid separation device.

It should be noted that a first preset constant and a second preset constant can be set in advance. For example, the first preset constant can be set to 0.95, the second preset constant can be set to 1.05, or they can be set to other values according to the actual situation, which is not limited in this embodiment.

It can be understood that if the comparison result is that the first current pressure $P\_9$ is less than the second current pressure $P\_8$, that is, $P\_9 < P\_8$, it means that the opening of the gas phase side valve 4 needs to be reduced. The current opening of the gas phase side valve 4 can be obtained, and then the target opening is calculated based on the first preset constant and the current opening of the gas phase side valve 4.

The target opening can be calculated by the following formula based on the first preset constant and the current opening of the gas phase side valve:

$$LR4\_{n+1} = 0.95 * LR4\_n;$$

where $LR4\_(n+1)$ is the target opening, $LR4\_n$ is the current opening, and 0.95 is the first preset constant.

It can be understood that if the comparison result is that the first current pressure $P\_9$ is greater than or equal to the second current pressure $P\_8$, that is, $P\_9 \geq P\_8$, it means that the opening of the gas phase side valve 4 needs to be increased. The current opening of the gas phase side valve 4 can be obtained, and then the target opening is calculated according to the second preset constant and the current opening of the gas phase side valve 4.

The target opening can be calculated by the following formula based on the second preset constant and the current opening of the gas phase side valve:

$$LR4\_{n+1} = 1.05 * LR4\_n;$$

where $LR4\_(n+1)$ is the target opening, $LR4\_n$ is the current opening, and 1.05 is the second preset constant.

Step S406, adjusting the opening of the gas phase side valve according to the target opening.

It should be noted that a third preset time can be set in advance. For example, the third preset time can be set to 1 minute, which is not limited in this embodiment.

It can be understood that after the target opening corresponding to the gas phase side valve 4 is calculated, the opening of the gas phase side valve 4 can be adjusted according to the target opening, so that the opening of the gas phase side valve 4 is adjusted to the target opening. Moreover, when the gas phase side valve 4 keeps running at the target opening for the third preset time, that is, when the gas phase side valve 4 keeps running at the target opening for 1 minute, the first current pressure and the second current pressure are obtained again, the current pressure difference between the first current pressure and the second current pressure is calculated, subsequent detection operations are performed, and the cycle continues until the current pressure difference value $\Delta P$ is less than the preset pressure value P0, that is, $\Delta P < P0$.

It should be noted that a fourth preset time can be set in advance. For example, the fourth preset time can be set to 20 minutes, which is not limited in this embodiment.

It can be understood that if the current pressure difference value $\Delta P$ is less than the preset pressure value P0, that is, $\Delta P < P0$, it means that there is currently no need to adjust the opening of the gas phase side valve 4, and the current opening of the gas phase side valve 4 can be controlled to remain unchanged. When the gas phase side valve 4 keeps running at the current opening for the fourth preset time, that is, when the gas phase side valve 4 keeps running at the current opening for 20 minutes, the first current pressure and the second current pressure is obtained again, the current pressure difference between the first current pressure and the second current pressure is calculated, and subsequent detection operations are performed to continue the cycle.

Figure 6:
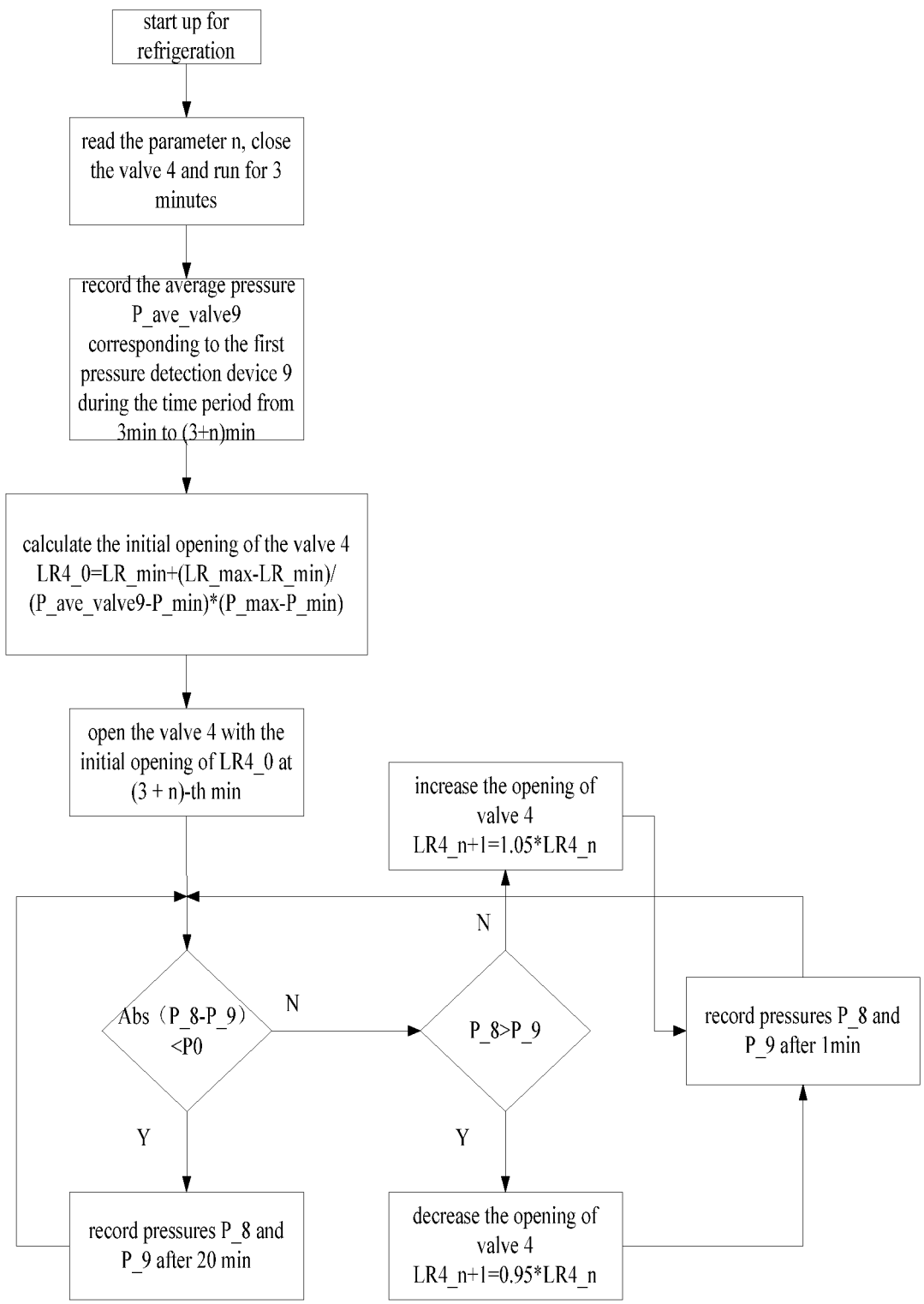
FIG. 6 is a schematic diagram of the overall process control of the method for controlling the air conditioner according to the first embodiment of the present application.

In the specific implementation, as shown in FIG. 6, FIG. 6 is a schematic diagram of the overall process control. The control logic is as follows:

1. the gas phase side valve 4 is locked within 3 minutes of starting up the air conditioner and the air conditioner operates in the normal refrigeration mode.
2. the average pressure P_ave_valve9 of the return air (first pressure detection device 9) from the 3rd minute to the (3+n)-th minute is recorded;
3. the initial opening LR4_0 of the gas phase side valve 4 is calculated through the average pressure P_ave_valve9;
4. starting from the (3+n)-th min, opening the gas phase side valve 4 with an opening of LR4_0 to enter the phase separation refrigeration mode. The gaseous low-temperature refrigerant separated by the gas-liquid separation device 6 passes through the heat exchanger 3 to improve the supercooling of the refrigerant at the outlet of the condenser. After passing through the heat exchanger 3, the gas phase refrigerant merges with the refrigerant at the outlet of the evaporator and returns to the compressor through the muffler;
5. the pressure difference between the gas state side pressure and the return air side pressure of the gas-liquid separation device is $\Delta P = P\_8 - P\_9$, and determining whether the calculated $\Delta P$ is less than the preset pressure value P0;
6. if $\Delta P > P0$, comparing the P_8 and P_9;
7. if $P\_9 < P\_8$, $LR4\_(n+1) = 0.95*LR4\_n$; and if $P\_9 > P\_8$, $LR4\_(n+1) = 1.05*LR4\_n$;
8. repeating steps 5 to 7 until $\Delta P < P0$;
9. if $\Delta P < P0$, running in this state for 20 minutes and then record P_8 and P_9 again, calculating $\Delta P$, and comparing $\Delta P$ with P0;
10. this program is always executed during system operation for cycle detection.

In this embodiment, the current pressure difference is determined through the first current pressure detected by the first pressure detection device and the second current pressure detected by the second pressure detection device, and the target opening is determined based on the current pressure difference to adjust the corresponding opening of the gas phase side valve. The flow rate of the gas phase is controlled through pressure feedback, which can achieve precise control and avoid control lag. In addition, through pressure feedback, it is also possible to ensure that all the return air side is gaseous refrigerant, avoiding compressor liquid shock caused by liquid backflow, and improving system reliability.

In addition, embodiments of the present application also provide a computer-readable storage medium on which a program for controlling the air conditioner is stored. When the program for controlling the air conditioner is executed by a processor, steps of the method for controlling the air conditioner as described above are implemented.

Since this computer-readable storage medium adopts all the technical solutions of the above embodiments, it has at least all the functions brought by the technical solutions of the above embodiments, which will not be described again.

Figure 7:
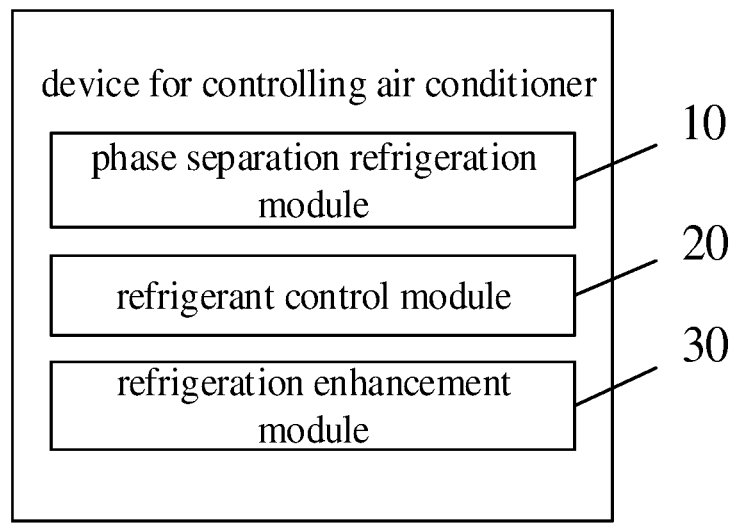
FIG. 7 is a functional module schematic diagram of a device for controlling the air conditioner according to the first embodiment of the present application.

In addition, referring to FIG. 7, the embodiment of the present application also proposes a device for controlling the air conditioner. The device for controlling the air conditioner includes: a phase separation refrigeration module 10, configured to open the gas phase side valve to enter the phase separation refrigeration mode after passage of the first preset period of time from starting up the air conditioner; a refrigerant control module 20, configured to control the gaseous low-temperature refrigerant separated by the gas-liquid separation device to pass through the gas phase side valve and reach the heat exchanger; and a refrigeration enhancement module 30, configured to control the gaseous low-temperature refrigerant to exchange heat with the refrigerant at the outlet of the condenser through the heat exchanger, so as to increase the supercooling degree of the refrigerant at the outlet of the condenser.

It should be noted that the gas-liquid separation device in this embodiment can be a gas-liquid separator, or a device that can achieve the same or similar functions, which is not limited in this embodiment. The heat exchanger in this embodiment can be a plate heat exchanger, or a device that can achieve the same or similar functions, which is not limited in this embodiment. The gas phase side valve in this embodiment can be a solenoid valve, or a device that can achieve the same or similar functions, which is not limited in this embodiment.

It should be understood that, as shown in FIG. 3, which is a schematic diagram of an air conditioner system. The air conditioner in this embodiment can include a compressor 1, a condenser 2 and a heat exchanger 3. The outlet of the compressor 1 can be connected to the inlet of the condenser 2, and the outlet of the condenser 2 can be connected to the inlet of the heat exchanger 3. The outlet of the heat exchanger 3 can be connected to the inlet of the gas-liquid separation device 6. Furthermore, a refrigeration valve 5 can be provided between the outlet of the heat exchanger 3 and the gas-liquid separation device 6.

It can be understood that since the gas-liquid separation device can separate the refrigerant into gas and liquid, the gas-liquid separation device 6 is provided with one inlet and two outlets, and the two outlets are respectively the gas phase outlet and the liquid phase outlet. The gaseous refrigerant separated by the gas-liquid separation device 6 can flow out from the gas phase outlet, and the liquid refrigerant separated by the gas-liquid separation device 6 can flow out from the liquid phase outlet.

It can be understood that the gas phase outlet of the gas-liquid separation device 6 can be connected to another inlet of the heat exchanger 3, and the other outlet of the heat exchanger 3 can be connected to the inlet of the compressor 1. A gas phase side valve 4 can also be provided between the gas phase outlet of the gas-liquid separation device 6 and the other inlet of the heat exchanger 3. The liquid phase outlet of the gas-liquid separation device 6 can be connected to the inlet of the evaporator 7, and the outlet of the evaporator 7 can be connected to the inlet of the compressor 1.

It can be understood that the refrigeration mode of the air conditioner in this embodiment can include a normal refrigeration mode and a phase separation refrigeration mode. When the air conditioner operates in the normal refrigeration mode, the refrigeration valve 5 can be controlled to open and the gas phase side valve 4 to close. At this time, a normal refrigeration operation is performed. When the air conditioner operates in the phase separation refrigeration mode, the refrigeration valve 5 can be controlled to open, and the gas phase side valve 4 is also opened. At this time, the gaseous low-temperature refrigerant separated by the gas-liquid separation device 6 and the heat exchanger 3 are used to exchange the refrigerant at the outlet of the condenser after heat exchange through the condenser again, thereby increasing the supercooling of the refrigerant to achieve better refrigeration effects.

It should be noted that a second preset period of time and parameter n can be set in advance. For example, the second preset period of time can be set to 3 minutes or other values, which is not limited in this embodiment. In this embodiment, 3 minutes will be used as an example for explanation. The first preset period of time can be calculated based on the second preset period of time and the parameter n. For example, when the second preset period of time is 3 minutes, the first preset period of time can be calculated as (3+n) minutes. In this embodiment, the specific value of the parameter n is not limited.

It can be understood that when the air conditioner just starts cooling, the air conditioner is controlled to enter the normal refrigeration mode. When the air conditioner starts cooling and runs for the first preset period of time, that is, when the air conditioner starts cooling and runs for (3+n) minutes, the gas phase side valve is controlled to open to switch the normal refrigeration mode to the phase separation refrigeration mode.

It should be understood that, in the phase separation refrigeration mode, the gas-liquid separation device can be controlled to separate the refrigerant from gas to liquid to obtain the separated gaseous low-temperature refrigerant. Then, the separated gaseous low-temperature refrigerant is controlled to flow out from the corresponding gas phase outlet of the gas-liquid separation device, is connected to the heat exchanger 3 through the gas phase side valve 4, and flows into the other inlet of the heat exchanger 3.

It can be understood that after the refrigerant discharged from the compressor undergoes heat exchange through the condenser, and the refrigerant at the outlet of the condenser is obtained. The refrigerant at the outlet of the condenser flows in from the inlet of the heat exchanger, and the gaseous low-temperature refrigerant separated by the gas-liquid separation device flows in from the other inlet of the heat exchanger. Therefore, the refrigerant at the outlet of the condenser after heat exchange in the condenser can be heat exchanged again through the gaseous low-temperature refrigerant in the heat exchanger, so that the supercooling degree of the refrigerant at the outlet of the condenser can be improved, and the refrigerant at the outlet of the condenser with increased supercooling degree is obtained. By exchanging heat with the indoor return air in the evaporator through the refrigerant at the outlet of the condenser with increased supercooling degree, the better refrigeration effect can be achieved.

It can be understood that this solution does not require an increase in the condenser and evaporator, nor does it require too much cost. This solution adopts phase separation technology, which can greatly improve the energy efficiency of the air conditioner. The gaseous refrigerant separated by the gas-liquid separation device is used to increase the supercooling degree of the refrigerant in the heat exchangers, which can further improve the refrigeration capacity.

It should be understood that, as shown in FIG. 3, after controlling the gaseous low-temperature refrigerant to enter the heat exchanger for heat exchange, the gaseous refrigerant after heat exchange through the heat exchanger and the refrigerant at the outlet of the evaporator after heat exchange through the evaporator are merged, the merged refrigerant is transferred to a muffler, and enters the compressor through the muffler.

In this embodiment, after the air conditioner starts and runs for a period of time, the gas phase side valve is controlled to open, causing the air conditioner to switch to the phase separation refrigeration mode. In the phase separation refrigeration mode, the gaseous low-temperature refrigerant can be separated through the gas-liquid separation device, and is controlled to reach the heat exchanger. The refrigerant at the outlet of the condenser is exchanged heat again through the gaseous low-temperature refrigerant and the heat exchanger, thereby increasing the supercooling degree of the refrigerant at the outlet of the condenser to increase the cooling capacity of the air conditioner. Compared to the existing method of increasing the evaporator and condenser, this solution adopts phase separation technology, which can not only increase the refrigeration capacity, but also does not require increase the cost too much.

For other embodiments or specific implementation methods of the device for controlling the air conditioner described in the present application, reference can be made to the embodiments of above method, which will not be described again here.

It should be noted that, as used herein, the terms "include", "comprise" or any other variation thereof are intended to cover a non-exclusive inclusion, such that a process, method, article or system that includes a list of elements not only includes those elements, but also includes other elements not expressly listed or that are inherent to the process, method, article or system. Without further limitation, an element defined by the statement "includes a . . ." does not exclude the presence of other identical elements in the process, method, article, or system that includes that element.

The above serial numbers of the embodiments of the present application are only for description and do not represent the advantages or disadvantages of the embodiments.

Through the above description of the embodiments, those skilled in the art can clearly understand that the methods of the above embodiments can be implemented by means of software plus the necessary general hardware platform, of course, also by hardware, but in many cases the former is better. Based on this understanding, the technical solution of the present application, in essence, or a part that contributes to the related art, can be embodied in the form of a software product. The computer software product is stored in the storage medium (such as ROM/RAM, magnetic disk, optical disk) as described above, including several instructions to cause a terminal device (which can be a mobile phone, computer, server, air conditioner, or network device, etc.) to execute the methods described in various embodiments of the present application.

The above are only some embodiments of the present application, and are not intended to limit the scope of the present application. Any equivalent structure or equivalent process transformation made using the contents of the description and drawings of the present application, or directly or indirectly applied in other related technical fields, are included in the scope of the present application.

What is claimed is:

1. A method for controlling an air conditioner, comprising:
    opening a gas phase side valve to enter a phase separation refrigeration mode, in response to passage of a first preset period of time from starting up the air conditioner;
    controlling a gaseous low-temperature refrigerant separated by a gas-liquid separation device to pass through the gas phase side valve and reach a heat exchanger; and
    controlling the gaseous low-temperature refrigerant to exchange heat with refrigerant at an outlet of a condenser through the heat exchanger to increase supercooling degree of the refrigerant at the outlet of the condenser,
    wherein the air conditioner comprises a compressor, the condenser and the heat exchanger connected in sequence, and the gas-liquid separation device, and
    wherein an outlet of the heat exchanger is connected to an inlet of the gas-liquid separation device, a gas phase outlet of the gas-liquid separation device is connected to an inlet of the heat exchanger, and the gas phase side valve is provided between the gas phase outlet of the gas-liquid separation device and the inlet of the heat exchanger,
    wherein the air conditioner further comprises an evaporator and a first pressure detection device, a liquid phase outlet of the gas-liquid separation device is connected to the evaporator, the evaporator is connected to the compressor, and the first pressure detection device is provided on a pipeline between the evaporator and the compressor,
    wherein before the opening the gas phase side valve in response to the passage of the first preset period of time after the starting up the air conditioner, the method further comprises:

controlling the gas phase side valve to close for a second preset period of time from the starting up the air conditioner, such that the air conditioner operates in a normal refrigeration mode during the second preset period of time;

determining a target period of time according to the second preset period of time and the first preset period of time, and obtaining an average pressure corresponding to the first pressure detection device during the target period of time; and determining an initial opening according to the average pressure, and wherein the opening the gas phase side valve in response to the passage of the first preset period of time after the starting up the air conditioner comprises:

opening the gas phase side valve according to the initial opening, in response to the passage of the first preset period of time after the starting up the air conditioner.

2. The method for controlling the air conditioner according to claim 1, wherein the air conditioner further comprises a second pressure detection device, and the second pressure detection device is provided on a pipeline between the gas phase outlet of the gas-liquid separation device and the gas phase side valve, and wherein after the controlling the gaseous low-temperature refrigerant to exchange heat with the refrigerant at the outlet of the condenser through the heat exchanger, the method further comprises:

obtaining a first current pressure corresponding to the first pressure detection device and a second current pressure corresponding to the second pressure detection device;

calculating a current pressure difference according to the first current pressure and the second current pressure;

comparing the first current pressure with the second current pressure, in response to that the current pressure difference is not less than a preset pressure value;

determining a target opening according to a comparison result and a current opening; and adjusting an opening of the gas phase side valve according to the target opening.

3. The method for controlling the air conditioner according to claim 2, wherein the determining the target opening according to the comparison result and the current opening comprises:

determining the target opening according to a first preset constant and the current opening, in response to the comparison result being that the first current pressure is less than the second current pressure; and determining the target opening according to a second preset constant and the current opening, in response to the comparison result being that the first current pressure is greater than or equal to the second current pressure.

4. The method for controlling the air conditioner according to claim 2, wherein after the adjusting the opening of the gas phase side valve according to the target opening, the method further comprises:

in response to that the gas phase side valve runs with the target opening for a third preset time, obtaining the first current pressure corresponding to the first pressure detection device and the second current pressure corresponding to the second pressure detection device.

5. The method for controlling the air conditioner according to claim 4, wherein after the determining whether the current pressure difference is less than the preset pressure value, the method further comprises:

maintaining the current opening of the gas phase side valve unchanged, in response to that the current pressure difference is less than the preset pressure value; and in response to that the gas phase side valve runs with the current opening for a fourth preset time, obtaining the first current pressure corresponding to the first pressure detection device and the second current pressure corresponding to the second pressure detection device.

6. The method for controlling the air conditioner according to claim 1, wherein after the controlling the gaseous low-temperature refrigerant to exchange heat with the refrigerant at the outlet of the condenser through the heat exchanger, the method further comprises:

controlling the gaseous refrigerant after passing through the heat exchanger to merge with the refrigerant at the outlet of the evaporator to obtain a merged refrigerant; and controlling the merged refrigerant to return to the compressor through a muffler.

7. A device for controlling an air conditioner, comprising one or more processors, wherein the one or more processors are configured to:

open a gas phase side valve to enter a phase separation refrigeration mode, in response to passage of a first preset period of time from starting up the air conditioner;

control a gaseous low-temperature refrigerant separated by a gas-liquid separation device to pass through the gas phase side valve and reach a heat exchanger; and control the gaseous low-temperature refrigerant to exchange heat with refrigerant at an outlet of a condenser through the heat exchanger, so as to increase a supercooling degree of the refrigerant at the outlet of the condenser, wherein before the opening the gas phase side valve in response to the passage of the first preset period of time after the starting up the air conditioner, the one or more processors are configured to:

control the gas phase side valve to close for a second preset period of time from the starting up the air conditioner, such that the air conditioner operates in a normal refrigeration mode during the second preset period of time;

determine a target period of time according to the second preset period of time and the first preset period of time, and obtaining an average pressure corresponding to a first pressure detection device during the target period of time; and determine an initial opening according to the average pressure, and wherein the opening the gas phase side valve in response to the passage of the first preset period of time after the starting up the air conditioner comprises:

opening the gas phase side valve according to the initial opening, in response to the passage of the first preset period of time after the starting up the air.

8. An air conditioner comprising a compressor, a condenser and a heat exchanger connected in sequence, and a gas-liquid separation device, wherein an outlet of the heat exchanger is connected to an inlet of the gas-liquid separation device, a gas phase outlet of the gas-liquid separation device is connected to an inlet of the heat exchanger, and a gas phase side valve is provided between the gas phase outlet of the gas-liquid separation device and the inlet of the heat exchanger;

the air conditioner further comprising: a memory, one or more processors and one or more programs stored in the memory, wherein when executed by the one or more processors, the one or more programs cause the one or more processors to perform a method for controlling the air conditioner, comprising:

opening the gas phase side valve to enter a phase separation refrigeration mode, in response to passage of a first preset period of time from starting up the air conditioner;

controlling a gaseous low-temperature refrigerant separated by the gas-liquid separation device to pass through the gas phase side valve and reach the heat exchanger; and controlling the gaseous low-temperature refrigerant to exchange heat with refrigerant at an outlet of the condenser through the heat exchanger to increase supercooling degree of the refrigerant at the outlet of the condenser, wherein the air conditioner further comprises an evaporator and a first pressure detection device, a liquid phase outlet of the gas-liquid separation device is connected to the evaporator, the evaporator is connected to the compressor, and the first pressure detection device is provided on a pipeline between the evaporator and the compressor, wherein before the opening the gas phase side valve in response to the passage of the first preset period of time after the starting up the air conditioner, the method further comprises:

controlling the gas phase side valve to close for a second preset period of time from the starting up the air conditioner, such that the air conditioner operates in a normal refrigeration mode during the second preset period of time;

determining a target period of time according to the second preset period of time and the first preset period of time, and obtaining an average pressure corresponding to the first pressure detection device during the target period of time; and determining an initial opening according to the average pressure, and wherein the opening the gas phase side valve in response to the passage of the first preset period of time after the starting up the air conditioner comprises:

opening the gas phase side valve according to the initial opening, in response to the passage of the first preset period of time after the starting up the air conditioner.

9. A non-transitory computer-readable storage medium storing one or more programs for controlling an air conditioner, wherein the one or more programs, when executed by one or more processors, cause the one or more processors to perform the method for controlling the air conditioner according to claim 1.

* * * * *